Nov. 19, 1929.    G. E. SMITH    1,736,674
ELECTRICALLY OPERATED TOWING MACHINE
Filed March 24, 1922    4 Sheets-Sheet 3

Fig. 3

Nov. 19, 1929.    G. E. SMITH    1,736,674
ELECTRICALLY OPERATED TOWING MACHINE
Filed March 24, 1922    4 Sheets-Sheet 4
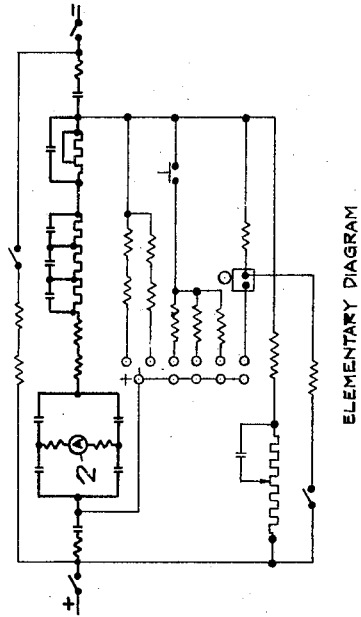
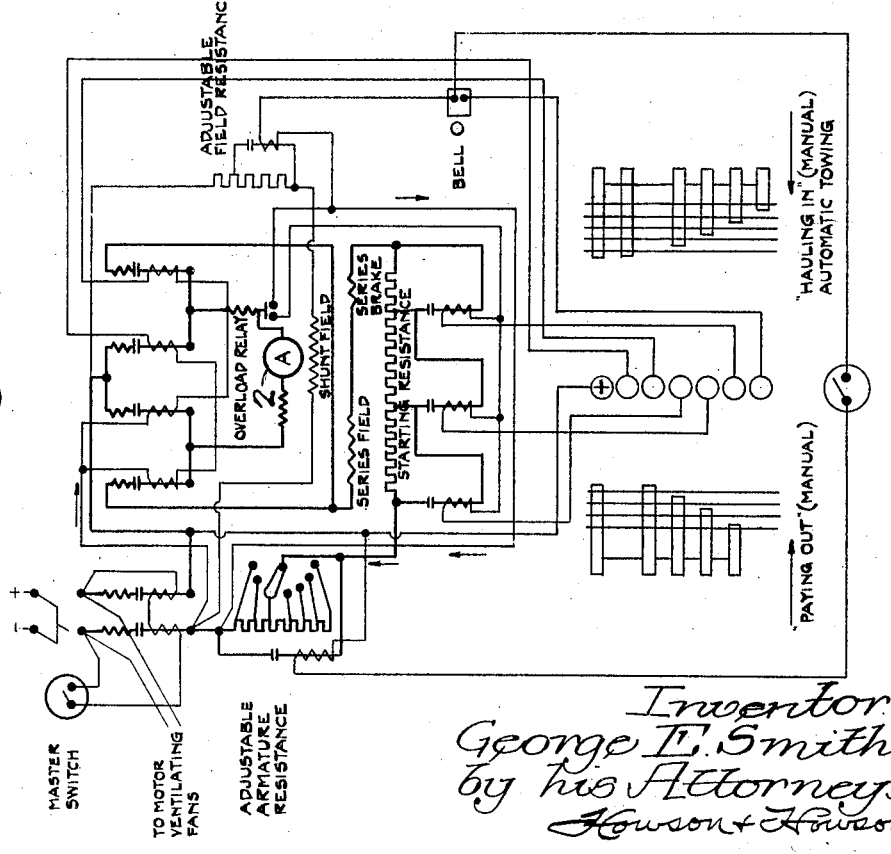

Patented Nov. 19, 1929

1,736,674

UNITED STATES PATENT OFFICE

GEORGE E. SMITH, OF PHILADELPHIA, PENNSYLVANIA, ASSIGNOR TO AMERICAN ENGINEERING COMPANY, OF PHILADELPHIA, PENNSYLVANIA, A CORPORATION OF PENNSYLVANIA

ELECTRICALLY-OPERATED TOWING MACHINE

Application filed March 24, 1922. Serial No. 546,313.

One object of this invention is to provide an electrically actuated machine designed to be carried by a steam or other vessel, for automatically controlling the winding up and paying out of a cable whereby a second vessel is being towed, the arrangement of parts being such as to insure and maintain a predetermined length of the cable between the two vessels.

The invention further contemplates an electrically controlled towing machine which, while permitting paying out of the cable whereby a vessel is towed when an abnormal stress is brought upon it, shall automatically wind up said cable to maintain its working length substantially constant after such abnormal stress has been relieved, and the invention also includes means whereby an increasing resistance is offered to the force acting to draw out the cable until such paying out is stopped.

Another object of the invention is to provide an electrically actuated towing machine possessing the above characteristics, which when desired, shall be operable by hand as well as automatically and which shall include novel safety devices for preventing injury under abnormal conditions.

I also desire to provide a novel system of automatic electrical apparatus for governing the paying out and hauling in of a cable such as is employed for towing vessels, which shall also include hand controlling members;—the construction being durable, simple, and not liable to require attention or repair for long periods of time.

Another object of my invention is to provide an electrical towing machine with means whereby its cable drum may be held from rotation independently of its actuating motor so as to permit inspection and repair of the latter and shall also include automatic controlling mechanism which may be disconnected at will to permit of the manual control of the apparatus.

These objects and other advantageous ends I attain as hereinafter set forth, reference being had to the accompanying drawings, in which, Figs. 1 and 2 are respectively a side elevation and a plan of an electric towing machine constructed in accordance with my invention;

Fig. 3 is a front elevation of the machine shown in Figs. 1 and 2;

Fig. 4 is an elementary diagram of the electrical apparatus and connections constituting part of my invention; and Fig. 5 is a diagram illustrating in detail the apparatus and connections more generally illustrated in Fig. 4.

Figure 1:
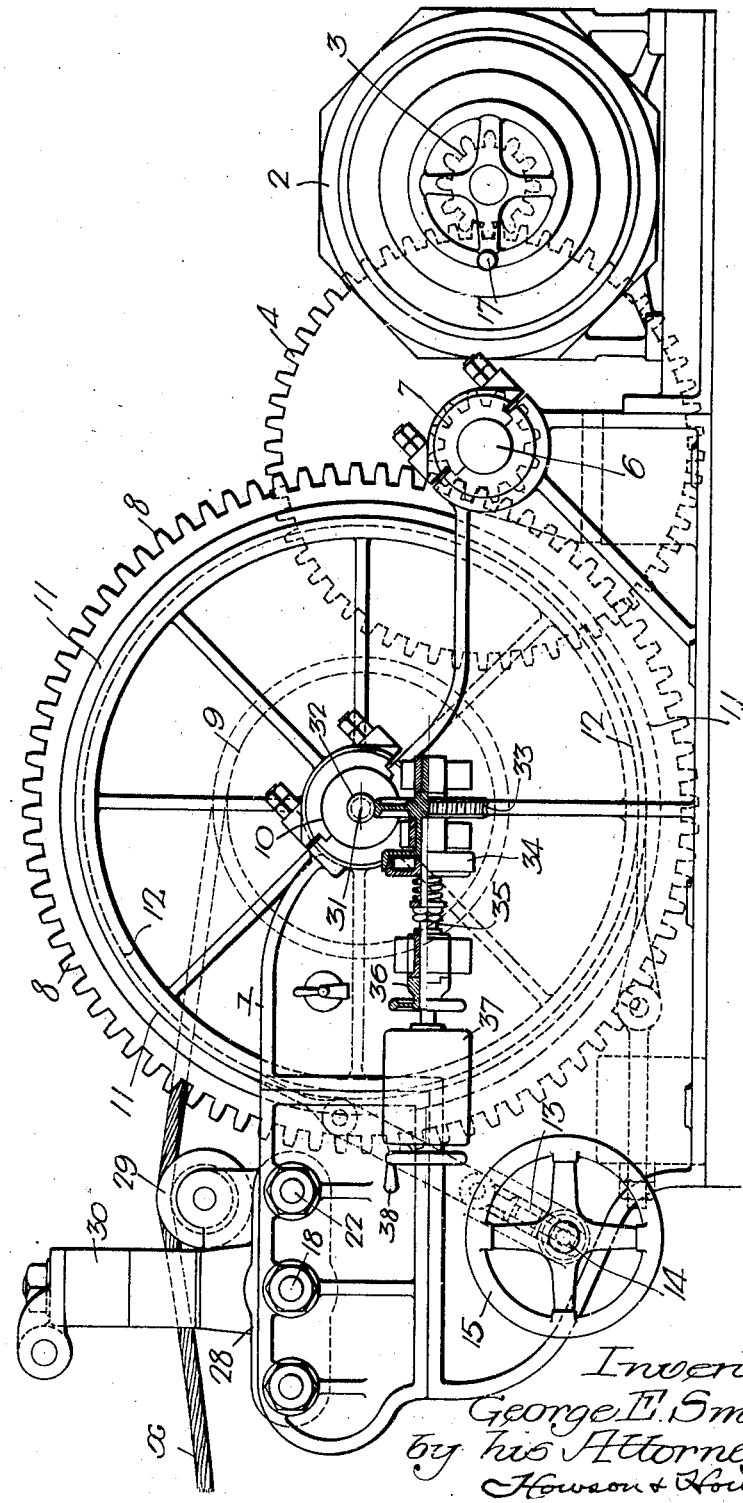
Figure 2:
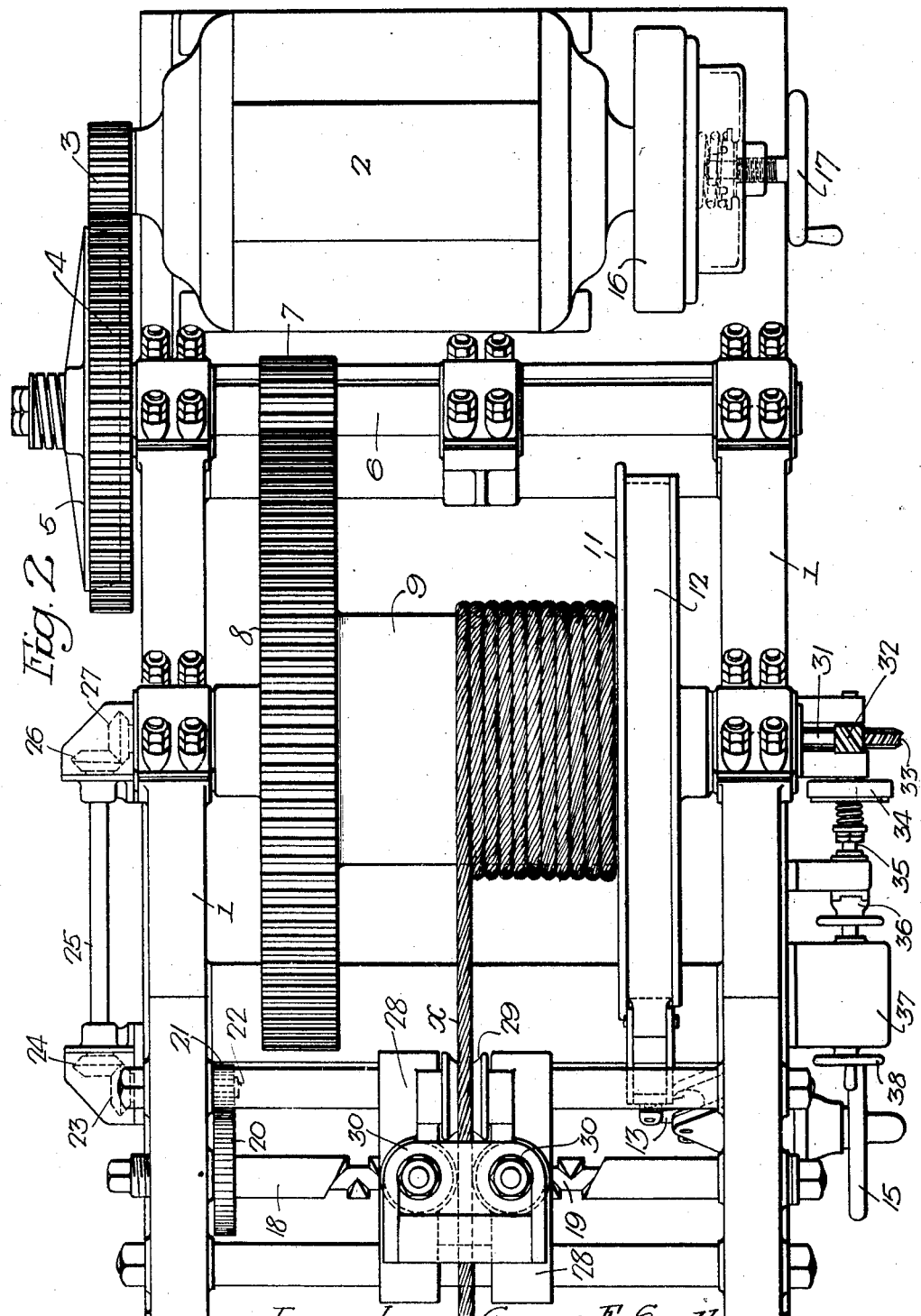

In the above drawings, 1 represents a suitable supporting frame or base structure providing a support for an electric motor 2, which has on its armature shaft a pinion 3 meshing with a gear 4. This latter is operatively connected through a friction clutch 5 with an intermediate shaft 6, having keyed to it a pinion 7 meshing with a gear 8 formed as part of or rigidly connected to a cable drum 9. The latter is mounted on a shaft 10 carried in suitable bearings supported by the frame 1, and there is likewise fixed to said drum a brake wheel or drum 11 for the reception of a brake band 12. The free end of the latter is connected to one arm of a bell crank lever 13 fulcrumed on the frame and having its second arm connected to a screw 14 slidably mounted in a bearing of the frame. A hand wheel 15 has its hub threaded on this screw to serve as a nut to cause longitudinal movement of said screw 14 and a consequent tightening or slacking off of the brake band 12 at will.

The arrangement of parts is such that the hand wheel 15 is conveniently mounted at one side of the frame and when desired it may be manipulated to so tighten the brake band as to effectually hold the drum 9 from rotation under the action of the cable X wound upon it. An electric or other brake 16 is suitably mounted to operate on the armature shaft of the motor 2 and by means of a hand wheel 17 may be adjusted to exert a predetermined resistance to the rotation of the motor armature.

For laying the cable on the drum in regularly disposed convolutions and layers, I provide a distributing device consisting of a shaft 18 journalled transversely in the frame 1 and having formed thereon a diamond screw 19. Through gears 20 and 21, shaft 22, bevelled gears 23 and 24, shaft 25 and bevelled gears 26 and 27, this shaft 18 is operatively connected to the drum shaft 10 and on said diamond screw is mounted a cable guiding carriage 28 actuated from said screw so that its direction of movement is automatically reversed at either end of its path of movement by suitable automatic means well known to the art and forming no part of this invention.

On the carriage 28 is mounted a vertical guiding pulley 29 and two horizontally disposed guiding pulleys 30—30 so placed as to direct and evenly distribute the cable X on the drum 9 as the carriage 28 is laterally reciprocated during the rotation of said drum. The drum shaft 10 is provided with an end extension 31 on which is mounted a worm 32 meshing with a worm wheel 33 connected through a safety friction clutch 34 to a shaft 35 extending along one side of the frame 1. By means of a jaw—or other positive clutch 36, this shaft may at will be connected to or disconnected from the movable element of an electric controller 37 which, when said clutch 36 is released, may be manually operated by a hand wheel 38.

With the above described arrangement of parts suitable apparatus, hereafter described, is provided whereby when the clutch 36 is opened and the controller 37 is operated by its hand wheel 38, currrent may be supplied to said motor to cause its armature to rotate in such a direction as to cause the cable X to be wound upon the drum 9, so that a predetermined required length of it remains connecting the vessel on which the above machine is mounted, with a second vessel to be towed. If now the hand wheel 15 be set up to apply the brake band 12 to the brake wheel 11, and the current be cut off from the motor 2, the second vessel will be towed by the cable in a manner which will be satisfactory and safe as long as the weather and other conditions are such that the tension on the cable is substantially constant. If however the weather is bad so that the tension on the cable is constantly varying, the hand wheel 17 is manipulated to cause the brake 16 to apply a predetermined resistance to the rotation of the armature of the motor 2, the clutch 36 is closed and hand wheel 15 is turned in such a direction as to release the brake band 12 from the wheel 11. Under these conditions, as long the tension on the cable remains below a predetermined amount, the brake 16 prevents its paying out, since it acts through the gears 3—4, shaft 6, gears 7—8 and through the cable drum.

In order that the apparatus shall automatically function in accordance with my invention, the field of the motor 2 is at all times energized and any heat generated under operating conditions is prevented from raising its temperature to a dangerous degree by ventilation or otherwise by means forming no part of the present invention.

If now an abnormal stress is exerted on the cable X, such as would cause the brake 16 to slip, the armature of the motor 2 is rotated as a certain amount of the cable is drawn off of the drum 9, and its resulting rotation through the gears 32 and 33, rotates the drum or movable element of the controller 37. This causes current to be first supplied to the armature of the motor through bodies of electrical resistance and thereafter causes successive cutting out of said bodies, so that said armature is rotated in such a direction as to cause the drum 9 to wind up the cable. In so doing, the movable member of the controller 37, through the gears 32 and 33, is returned to its off position, and current is cut off of the armature circuit of the motor 2 when the length of cable drawn off the drum has been returned thereto.

If the stress on the cable X is sufficiently great to continue the rotation of the drum 9 in spite of the increased torque of the motor 2 due to the cutting out of the resistance from its armature circuit as above described, then further rotation of the controller drum will short circuit certain adjustable shunt field resistance of the motor 2, thus further increasing its torque and usually causing it to wind up the cable on the drum 9 to its original amount and return the controller drum to its neutral or off position.

If in spite of the above noted increase of the torque of the motor 2, the tension on the cable X is sufficient to continue to draw it out, the further rotation of the drum of the controller is prevented by means of a suitable stop (not shown), whereupon the friction clutch 34 slips and at the same time a suitable alarm is actuated. As soon as the abnormal tension is relieved, the motor automatically winds up the cable paid out and returns the drum of the controller 37 to its neutral position, although if such tension is not relieved, the hand wheel 15 may be operated to cause the friction band 12 to grip the brake drum 11 and so hold the cable drum 9 from rotation. Obviously, by disengaging the positive clutch 36, the handle 38 of the controller 37 may be operated in either direction to cause the motor 2 to rotate the drum 9 to permit paying out or winding up of the cable X. As soon as the desired amount of cable has been wound on said drum the closing of the clutch 36 again applies the automatic controlling mechanism to the motor 2, so that it permits paying out of the cable under excessive stresses and thereafter again winds it up to maintain a substantially constant distance between the machine and the vessel towed.

I claim:

1. The combination in an electric towing machine of a cable drum; a cable therefor; means normally opposing turning of said drum under the normal tension on the cable; a normally ineffective electric motor connected to the drum; follow-up mechanism for causing the operation of the motor and drum to wind up the cable after it has been drawn out, said mechanism including a controller and a safety clutch for the latter; means for rendering ineffective said controller at will, and means for manually operating the controller.

2. The combination in an electric towing machine of a cable drum; a cable therefor; means normally opposing turning of said drum under the normal tension on the cable; a normally ineffective electric motor connected to the drum; with an electric controller operatively connected to said drum and adapted to start the motor when the drum is rotated by abnormal stress on the cable, including means for increasing the torque of the motor as the drum is further rotated by the continued withdrawal of the cable therefrom, said operative connection being interrupted upon a continued movement of said controller beyond a predetermined extent.

3. The combination in an electric towing machine of a cable drum; means normally opposing turning of the drum under the normal tension on a cable wound thereon; a normally ineffective electric motor connected to the drum; electrical follow-up mechanism for causing the electric motor to automatically restore the cable to the drum after said cable has been drawn therefrom, said mechanism including an electric controller connected to be actuated from the drum, means for limiting the forces exerted by said drum on said controller, and means for disconnecting said controller from the drum at will; and means for operating said controller by hand when it is disconnected from the drum.

GEORGE E. SMITH.